Aug. 28, 1928.  S. B. DRESSLER  1,682,490

FRESNEL TYPE LENS

Filed Oct. 3, 1925

Inventor:
Sigmund B. Dressler
By H. H. Dyke
his Atty.

Patented Aug. 28, 1928.

1,682,490

UNITED STATES PATENT OFFICE.

SIGMUND B. DRESSLER, OF NEWARK, NEW JERSEY.

FRESNEL-TYPE LENS.

Application filed October 3, 1925. Serial No. 60,236.

My invention relates to a lens of the Fresnel type, and particularly to such a lens adapted to provide a broad light beam for signal purposes, as distinguished from the vertical pencil stripe of light obtained with use of the ordinary Fresnel lens.

With a lens in accordance with my invention on signal lights for highways, railroads, etc., vision of the signal light is not interfered with when viewed from angles at which the light with the use of the usual form of Fresnel lens would be invisible or practically so, and when viewed from a relatively short range, is free from any tendency to overpower or blind the observer because of the manner in which the rays are broken up.

Figure 1:
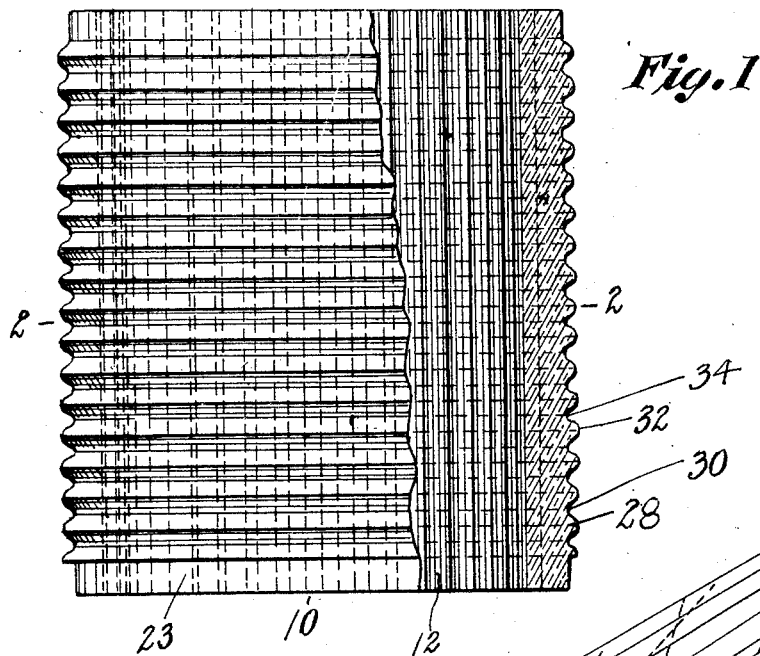
Figure 2:
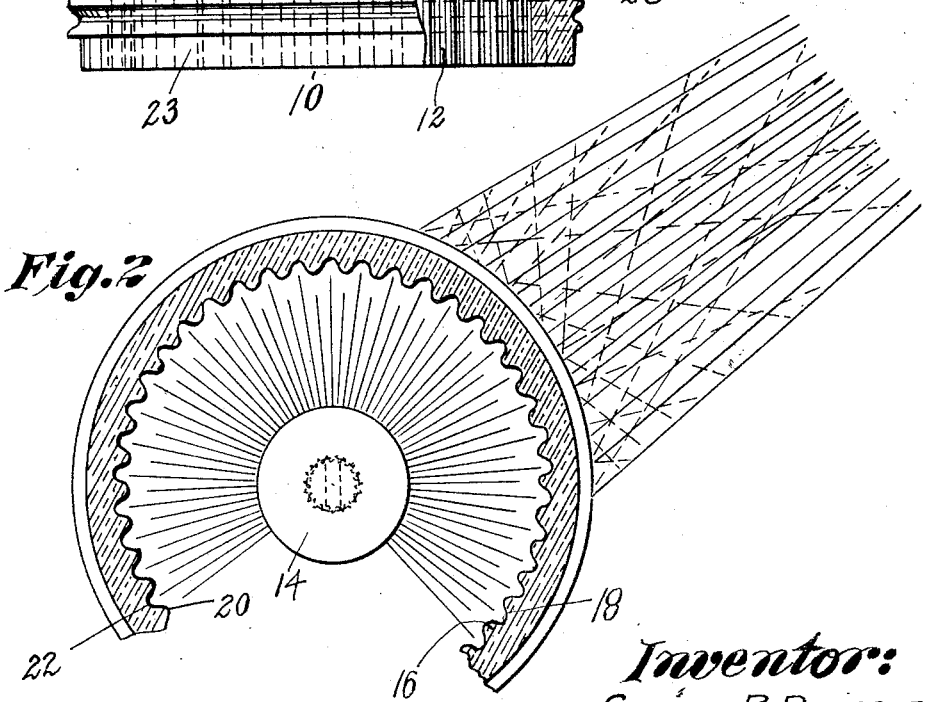

In the accompanying drawing illustrating an embodiment of my invention, Fig. 1 is an elevational view partly in section, and Fig. 2 is a section on line 2—2, Fig. 1.

Reference character 10 designates the lens generally, which is preferably of molded glass. Same is here shown cylindrical, but variation in form and making up in sections may be resorted to as is common with lenses of the Fresnel type.

The inner surface 12 exposed directly to the source of light 14, is provided with prismatic surfaces arranged to extend elementally of the cylindrical lens, that is to say parallel to the cylinder axis. Same preferably take the form of corrugations or alternate ribs 16 and grooves 18, both ribs and grooves having rounded apices 20 and 22. The refraction and dispersal of light beams due to this construction is indicated diagrammatically by the lines on Fig. 2.

The outer surface 23 of the lens is also provided with rounded prismatic surfaces, which preferably take the form of alternate annular ribs 28 and grooves 30 with rounded apices or buses 32, 34, and defining planes or zones at substantially a right angle to the inner prismatic members.

The provision of such prismatic members 28, 30 serves to materially increase the breadth of the zone in which the signal light is readily visible. At distances such as 500 yards a light with the improved lens is very readily visible from a wide range of directions and elevations, and at close range, as, for example, when used at traffic intersections in roadways, casts a light so diffused and without glare as to be readily faced by drivers of vehicles without their experiencing material interference with good vision.

I claim:

A substantially cylindrical lens having circumferentially arranged substantially corrugated prismatic surfaces on its outer face comprising ribs with rounded apices and grooves with rounded bases arranged between the ribs, and similar prismatic surfaces on its inner face arranged substantially parallel to the cylinder axis and at right angles to the prismatic surfaces on its outer face.

In testimony whereof, I have signed my name hereto.

SIGMUND B. DRESSLER.